(12) United States Patent
Klapper (10) Patent No.: US 10,807,835 B2
(45) Date of Patent: Oct. 20, 2020

(54) RUNNING WHEEL FOR A CRANE

(71) Applicant: Hans Kunz GmbH, Hard (AT)

(72) Inventor: Georg Klapper, Hard (AT)

(73) Assignee: Hans Künz GmbH, Hard (AT)

( * ) Notice: Subject to any disclaimer, the term of this patent is extended or adjusted under 35 U.S.C. 154(b) by 225 days.

(21) Appl. No.: 15/951,678

(22) Filed: Apr. 12, 2018

(65) Prior Publication Data

US 2018/0312374 A1    Nov. 1, 2018

(30) Foreign Application Priority Data

Apr. 26, 2017   (AT) .................. A 171/2017

(51) Int. Cl.
  *B66C 9/08*     (2006.01)
  *F16C 13/00*    (2006.01)
  *B60B 3/04*     (2006.01)

(52) U.S. Cl.
  CPC .............. *B66C 9/08* (2013.01); *B60B 3/044* (2013.01); *F16C 13/006* (2013.01)

(58) Field of Classification Search
  CPC ......... B60B 3/041; B60B 3/044; B60B 3/045; B60B 23/00; B66C 9/08; F16C 13/006
  See application file for complete search history.

(56) References Cited

U.S. PATENT DOCUMENTS

| 1,377,634 A | 5/1921 | Slick |
| 1,751,007 A * | 3/1930 | Kreissig ............. B60B 17/0055 295/15 |
| 3,915,490 A * | 10/1975 | Ranger ............... B60B 17/0034 295/21 |
| 6,601,271 B1 * | 8/2003 | Sommerfeld ........ A47C 19/024 16/2.2 |
| 7,739,960 B2 | 6/2010 | Moll et al. |
| 9,000,323 B2 | 4/2015 | Dietrich et al. |

FOREIGN PATENT DOCUMENTS

| DE | 2944013 | 5/1981 |
| DE | 102010005873 | 7/2011 |
| DE | 102011117444 | 5/2013 |
| EP | 1892169 | 2/2008 |
| GB | 1212235 | 11/1970 |
| GB | 2052014 | 1/1981 |

OTHER PUBLICATIONS

DIN 15083: German Standards, Cranes, Crane Rail Wheels, machined tyres, 2 pages, Dec. 1977.

* cited by examiner

*Primary Examiner* — Kip T Kotter
(74) *Attorney, Agent, or Firm* — Volpe Koenig (57) ABSTRACT

A running wheel (1, 2) for a crane (16), in particular gantry crane, comprising a shaft (3), a wheel rim (4) and a hub (5) connecting the shaft (3) to the wheel rim (4) for rotation therewith, at least one connection between the hub (5) and the shaft (3) and/or between the hub (5) and the wheel rim (4) having a press fit (6) and a first form fit established by a first stop surface (8), the first form fit blocking a relative movement of the hub (5) in relation to the shaft (3) or the wheel rim (4) in a first direction (17) running parallel to an axis of rotation (7) of the running wheel (1, 2), wherein the connection additionally has at least one second form fit established by a second stop surface (9), wherein the second form fit blocks the relative movement of the hub (5) in relation to the shaft (3) or the wheel rim (4) in a second direction (18) opposed to the first direction (17).

11 Claims, 6 Drawing Sheets

RUNNING WHEEL FOR A CRANE

INCORPORATION BY REFERENCE

The following documents are incorporated herein by reference as if fully set forth: Austrian Patent Application No. A171/2017, filed Apr. 26, 2017.

BACKGROUND

The present invention relates to a running wheel for a crane, in particular a gantry crane, comprising a shaft, a wheel rim and a hub connecting the shaft to the wheel rim for rotation therewith, at least one connection between the hub and the shaft and/or between the hub and the wheel rim having a press fit and a first form fit established by a first stop surface, the first form fit blocking a relative movement of the hub in relation to the shaft or the wheel rim in a first direction running parallel to an axis of rotation of the running wheel. Furthermore, the invention relates to a method for producing a running wheel of this type and to a crane with at least one running wheel.

Cranes, in particular gantry cranes, are used for transporting containers or other loads. In addition to the lifting and lowering, i.e. a movement in the vertical direction, moving of containers or other loads in at least one horizontal direction is generally also necessary in order to deposit the containers or the load at a predetermined place, to transfer them to trucks, to stack them on one another, etc. A trolley of the crane, also called crane trolley, generally runs here along running rails fastened to a crane girder of a crane and permits the movement of the transport device in a first horizontal direction while the crane, in particular a rail-bound crane, is movable, frequently in its entirety, in a second horizontal direction on running rails fastened, for example, to a foundation.

In order to permit the horizontal displacement of the trolley or of the crane, the trolley or the crane as a whole is supported on the running rails mentioned via running wheels which have a tread. The running rails on which the trolley is supported may also be referred to as trolley rails. The running rails on which the crane as a whole is supported may also be referred to as crane rails. Circumferential forces to be transmitted via a respective running wheel are produced, for example, by a drive which interacts with the running wheel and are transmitted by a frictional connection to the running rail for the propulsion of the trolley or of the crane. The forces acting in a direction which is parallel to the axis of rotation of the running wheel and which may also be referred to as the axial direction of the running wheel are also referred to as lateral forces and arise during the normal driving mode, for example because of the skew of the crane on the running rails. The directions running orthogonally to the axis of rotation of the running wheel are also referred to here as radial directions. Furthermore, radial forces are also in action because of the dead weight of the crane and of the trolley or of the weight of the loads to be lifted.

It is known in the prior art to produce the entire running wheel integrally in terms of material from a blank. The running wheel then comprises at least one shaft section for connection to the drive, and the tread for supporting on the running rail. However, this solution can only be realized economically in large piece numbers, in which case the running wheels are then advantageously produced by drop forging or casting.

It is furthermore known to assemble the running wheel from individual components, i.e. from a shaft, a wheel rim and a hub. For this purpose, press fits are generally used for connecting the components mentioned, wherein, for this purpose, the components which are to be connected are pressed into one another in the axial direction, for example as far as a shoulder establishing a form fit. In order to ensure a secure press fit between the hub and the shaft and/or the wheel rim, corresponding oversizes have to be provided at the respective connecting points, as defined, for example, in DIN 15083:1977-12. It has turned out in practice that high internal stresses may arise in the running wheels because of thermal treatment processes (e.g. hardening and tempering processes or the surface hardening of the tread) in combination with the shrinking process or the required oversizes of the press fits. These internal stresses firstly reduce the load-bearing capacity of the running wheel, in particular of the wheel rim, and at the same time reduce the wear resistance of the surface, in particular of the tread of the wheel rim.

SUMMARY

It is therefore the object of the invention to provide a running wheel of the type mentioned at the beginning, in which the stresses occurring in the running wheel can be reduced in relation to the prior art.

This objective is realized with a running having one or more features of the invention.

In the case of the running wheel according to the invention, it is therefore provided that the connection additionally has at least one second form fit established by a second stop surface, wherein the second form fit blocks the relative movement of the hub in relation to the shaft or the wheel rim in a second direction opposed to the first direction.

The invention is based on the concept of configuring the press fit substantially only for transmitting torques, i.e. the driving forces which are transmitted to the running rail via the running wheel. A substantially smaller oversize of the components to be joined is required for this purpose. The oversize which is reduced in relation to the prior art leads to the security against sliding off laterally being reduced. That is to say that, in the event of high lateral forces, the wheel rim would be able to slide off from the hub or the hub from the shaft. However, the design according to the invention of the connection with a second form fit makes it possible to prevent the relative movement of the hub in relation to the shaft or of the hub in relation to the wheel rim in a second direction opposed to the first direction. As a result, it is firstly possible to achieve sufficient security against sliding off laterally. Secondly, internal stresses arising as a result of thermal treatment steps, etc. in the running wheel can be reduced because of the oversize of the press fit that is reduced in comparison to the prior art. Running wheels according to the invention therefore have overall higher loading capacities and service lives.

Within the context of the invention, the term shaft also includes axles which have a pure loading or bearing function, i.e. transmission of torques via the running wheel to the crane rail is not obligatory.

Within the context of the invention, the wheel rim could also be referred to as wheel tire or rim. The wheel rim comprises a tread which revolves in the circumferential direction and is supported on the running rail.

The term hub should also be broadly interpreted within the context of the invention. The hub could also be referred to as a web of the running wheel. At least in an operating state of the running wheel, the hub is fastened on the shaft. Furthermore, the wheel rim surrounds the hub in the radial direction with respect to the axis of rotation of the running wheel. In other words, the wheel rim is fastened to the outer side of the hub. The hub is the connecting body between shaft and wheel rim.

The connection between the shaft and the hub could also be referred to as a shaft-hub connection. The connection between the hub and the wheel rim could also be referred to as a hub-wheel rim connection. The running wheel according to the invention therefore has a shaft-hub connection and/or a hub-wheel rim connection. If the "connection" of the running wheel is discussed in general below, this may be both a shaft-hub connection and a hub-wheel rim connection of the running wheel within the context of the invention.

Within the scope of this document, the term press fit refers to an interference fit between two components which are connected to each other by press joining. The press fit can be an interference fit which is produced, for example, by longitudinal press joining or shrink fit joining. In general, a press fit is understood as meaning a force-fitting (or frictionally-locking) connection of two components, wherein the largest size of a bore of a first component is smaller in every case than the smallest size of a cross section of a second component, which cross section is to be pushed into the bore. After the joining together, the components are connected to each other by the press fit, wherein the transmittable torque is determined by the oversize, for example of an outside diameter of the shaft in relation to an inside diameter of the hub.

In order to form a shaft-hub connection, it is preferably provided that the press fit connects a press fit inner surface, which faces the axis of rotation of the running wheel, of the hub and a press fit outer surface, which faces away from the axis of rotation of the running wheel, of the shaft to each other with a force fit. The press fit inner surface of the hub bounds the hub in the region of the press fit inward in the radial direction with respect to the axis of rotation of the running wheel. The press fit outer surface of the shaft bounds the shaft in the region of the press fit outward in the radial direction with respect to the axis of rotation of the running wheel. Alternatively or additionally, it can be provided, in the case of a hub-wheel rim connection, that the press fit connects a press fit inner surface, which faces the axis of rotation of the running wheel, of the wheel rim and a press fit outer surface, which faces away from the axis of rotation of the running wheel, of the hub to each other with a force fit. The press fit inner surface of the wheel rim bounds the wheel rim in the region of the press fit inward in the radial direction with respect to the axis of rotation of the running wheel. The press fit outer surface of the hub bounds the hub in the region of the press fit outward in the radial direction with respect to the axis of rotation of the running wheel.

It is preferably provided that the press fit is arranged in the region between the first stop surface and the second stop surface. The press fit therefore advantageously extends between the first stop surface, which secures the first form fit, and the second stop surface, which secures the second form fit. It is particularly preferably provided that the first stop surface and the second stop surface are arranged adjacent to the press fit. However, the two stop surfaces themselves do not form the press fit.

The first stop surface and the second stop surface are advantageously oriented orthogonally to the axis of rotation of the running wheel. The pressing forces, which are produced by the press fit, of the connection are preferably oriented in the radial direction with respect to the axis of rotation of the running wheel.

In one possible embodiment of the running wheel, it can be provided that the shaft has the first stop surface and the second stop surface, and the first stop surface and the second stop surface and the press fit outer surface of the shaft are connected to one another integrally in terms of material. Alternatively or additionally, it can be provided that the wheel rim has the first stop surface and the second stop surface, and the first stop surface and the second stop surface and the press fit inner surface of the wheel rim are connected to one another integrally in terms of material. It can advantageously also be provided that the wheel rim as a whole is formed integrally, in particular integrally in terms of material, and has the first stop surface and the second stop surface and the press fit inner surface and the tread.

In one possible variant embodiment of a shaft-hub connection of the running wheel, it can be provided that the press fit inner surface of the hub is conical at least in regions, and a smallest inside diameter of the press fit inner surface is adjacent to the second stop surface of the shaft in an operating state of the running wheel. In order to fasten the wheel rim on the hub in a hub-wheel rim connection, it can be provided that the press fit outer surface of the hub is conical at least in regions and a largest outside diameter of the press fit outer surface is adjacent to the second stop surface of the wheel rim in an operating state of the running wheel.

It is advantageously provided that the shaft and/or the wheel rim has or have an integrally formed insertion bevel, wherein the insertion bevel, as seen in a direction parallel to the axis of rotation of the running wheel, is arranged on a side of the second stop surface that faces away from the press fit. The centering of the components to be joined can also be facilitated by an insertion bevel.

In a method for producing a running wheel according to the invention, it can be provided that the hub is pushed in the first direction into the wheel rim, wherein the second stop surface is elastically deformed during the pushing in of the hub, and, in a completely pushed-in joining state, in which the hub is in contact with the first stop surface, the second stop surface at least substantially takes up its original shape and the second stop surface establishing the second form fit blocks the relative movement of the hub in relation to the wheel rim in the second direction. In other words, it can therefore be provided that the second form-fitting element which has the second stop surface essentially takes up its original shape in a manner similar to a snap connection, after the hub is pushed into the wheel rim, and, furthermore, the second stop surface which secures the second form fit prevents the hub from sliding off from the wheel rim.

Alternatively or additionally, in order to produce a connection according to the invention between the shaft and the hub, it can be provided that the shaft is pushed into the hub in the first direction, wherein the second stop surface is elastically deformed during the pushing in of the shaft, and, in a completely pushed-in joining state, in which the shaft is in contact with the first stop surface, the second stop surface at least substantially takes up its original shape and the second stop surface establishing the second form fit blocks the relative movement of the shaft in relation to the hub in the second direction.

In another possible embodiment, the running wheel could have at least one securing device, wherein the second stop surface is arranged on the securing device. In other words, it is therefore provided that the running wheel has an additional securing device which prevents the hub from sliding off from the shaft or from the wheel rim in the second direction. It would also be conceivable and possible for the first stop surface also to be arranged on a further securing device.

It is advantageously provided that the at least one securing device is a securing ring which, at least in an operating state of the running wheel, engages in a groove formed on the wheel rim or on the shaft. Securing rings are known per se and are referred to inter alia also as a grooved ring.

It is preferably provided that the securing device is fastenable or fastened to the wheel rim or to the shaft, preferably so as to be releasable again without destruction.

Alternatively to the securing ring, it is conceivable and possible for the securing device to be fastenable or fastened to the wheel rim or to the shaft, preferably so as to be releasable without destruction, by connecting elements, preferably screws. The securing device could comprise, for example, a flange ring which is fastenable or fastened to the wheel rim or to the shaft by connecting elements. Alternatively to screws, rivets or other suitable connecting elements could also be provided for fastening the flange ring.

The flange ring is advantageously designed to be circumferentially closed in the circumferential direction. Alternatively, it is also conceivable and possible for the securing device to comprise a multiplicity of securing elements which are fastenable or fastened to the wheel rim or to the shaft, preferably so as to be releasable again without destruction, by connecting elements, preferably screws, and which each form a second stop surface. The multiplicity of, preferably screwable, securing elements could then be arranged, for example, in a manner distributed in the circumferential direction.

It is preferably provided that the tread of the wheel rim has a diameter within the range of 300 mm to 1200 mm, preferably of 400 mm to 1000 mm. It is particularly preferably provided that the diameter of the tread of the wheel rim lies within the range of 500 mm to 710 mm. Since the diameter of the tread of the wheel rim is a characteristic dimension of the running wheel, said diameter could also be referred to as the running wheel diameter.

It is advantageously provided that the shaft and/or the hub and/or the wheel rim is or are comprised of metal, in particular steel.

It is expressly emphasized at this juncture that the running wheel according to the invention for a crane is not a running wheel for a toy crane, model crane or the like.

Furthermore, the invention comprises a crane, in particular gantry crane, with at least one running wheel according to the invention. The running wheel according to the invention can be used, for example, as a running wheel for moving the crane along crane rails, i.e. as a crane running wheel. Alternatively or additionally, it is conceivable and possible that the running wheel according to the invention is a running wheel of a trolley, i.e. a trolley running wheel, of a crane, in particular of a gantry crane.

BRIEF DESCRIPTION OF THE DRAWINGS

Further features and details of preferred embodiments of the invention will be explained with reference to the exemplary embodiments of running wheels according to the invention and of a crane according to the invention that are illustrated in the figures, in which:

FIGS. 12 to 14 show a fourth exemplary embodiment of a running wheel according to the invention analogously to FIGS. 2 to 4, wherein FIG. 14 shows the detail D of FIG. 13;

FIGS. 15 to 18 show a fifth exemplary embodiment according to the invention analogously to FIGS. 8 to 11, wherein FIG. 18 shows the detail E from FIG. 17.

DETAILED DESCRIPTION OF THE PREFERRED EMBODIMENTS

Figure 1:
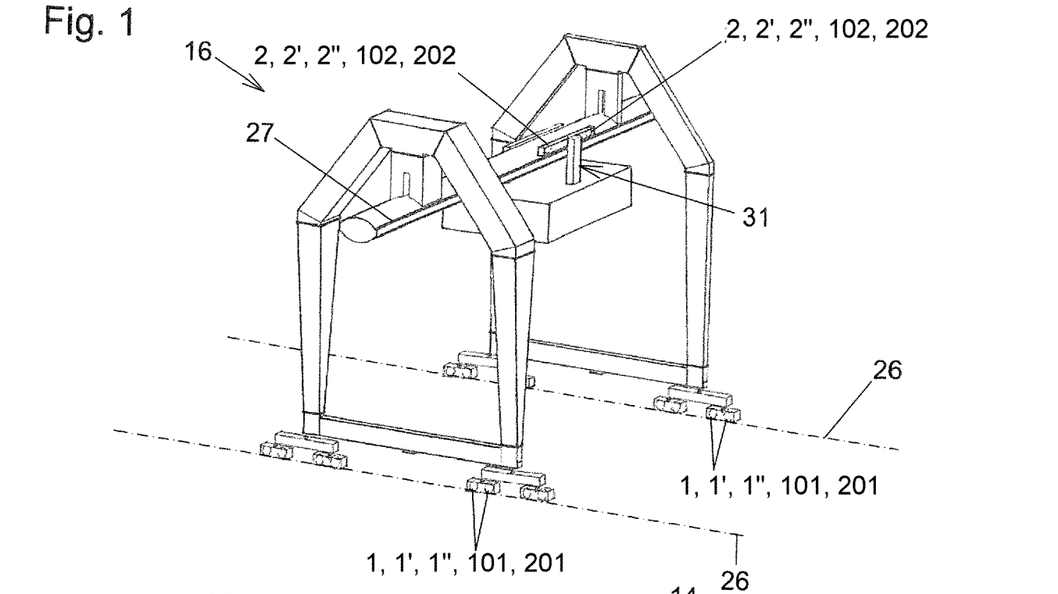
FIG. 1 shows a crane which is designed as a gantry crane with running wheels according to the invention.
Figure 2:
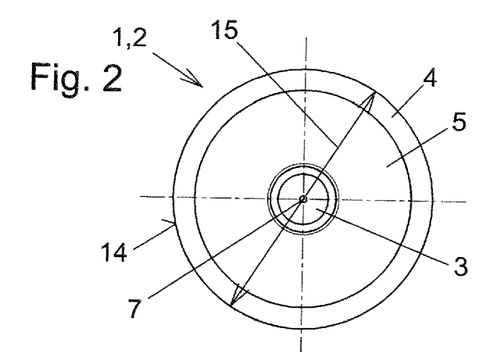
FIG. 2 shows a first exemplary embodiment of a running wheel according to the invention as seen in a side view in a direction parallel to the axis of rotation of the running wheel.
Figure 3:
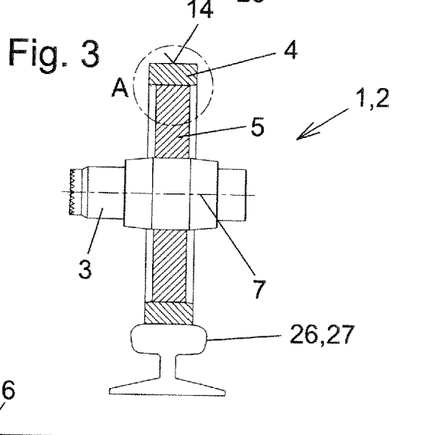
FIG. 3 shows a longitudinal center section in a sectional plane, placed through the longitudinal center axis, of the running wheel according to FIG. 2, with the shaft being illustrated in un-sectioned form.

FIG. 1 shows a crane 16, which is designed as a gantry crane, for transporting containers (not illustrated) in a container terminal. The crane 16 is displaceable or movable horizontally along a longitudinal extent of running rails 26, in particular crane running rails. The running rails 26 are merely indicated by chain-dotted lines in FIG. 1. The crane 16 is supported on the running rails 26 via running wheels 1, 1', 1", 101, 201, in particular crane running wheels.

Furthermore, the gantry crane 16 comprises a crane girder (not labeled specifically) on which running rails 27 of the crane 16 are arranged. These running rails 27 could also be referred to as trolley rails. A trolley 31 of the crane 16 is displaceable in the horizontal direction along the running rails 27. The trolley 31 is supported on the running rails 27 via running wheels 2, 2', 2", 102, 202, also called trolley running wheels. Only one of the two running rails 27 is illustrated in FIG. 1. In an alternative embodiment, the crane 16 could also have two crane girders which are spaced apart from each other and on which in each case one of the running rails 27 is fastened.

The exemplary embodiments described below are alternative variant embodiments of the connection between a shaft 3, 203, 303 and a hub 5, 5', 5", 205, 305, i.e. a shaft-hub connection of a running wheel 1, 1', 1", 101, 201, 2, 2', 2", 102, 202 and/or between the hub 5, 5', 5", 205, 305 and a wheel rim 4, 4', 4", 104, i.e. a hub-wheel rim connection of a or the running wheel, 1', 1", 101, 201, 2, 2', 2", 102, 202. The similarities of the exemplary embodiments shown will be discussed below.

In the exemplary embodiments shown, the shaft 3 is composed of steel, as is also preferred. The shaft 3, 203, 303 could be composed, for example, of unalloyed or low-alloy tempering steel. In the tempered state, the tempering steel advantageously has tensile strengths of between 500 MPa (megapascal=N/mm$^2$) and 1000 MPa.

In the exemplary embodiments, as is also preferred, the hub 5, 5', 5", 205, 305 is likewise manufactured from steel. The hub is advantageously composed of structural steel having tensile strengths of between 350 MPa and 800 MPa. An example of a suitable material for the hub 5 is structural steel S355J2.

The wheel rim 4, 4', 4", 104 used in the exemplary embodiments is preferably manufactured from steel. The wheel rim 4, 4', 4", 104 is advantageously comprised of a hardenable, low-alloy tempering steel having tensile strengths of between 700 MPa and 1200 MPa. Examples of suitable materials for the wheel rim 4, 4', 4", 104 are 42CrMo4 or 34CrNiMo6 or 30CrNiMo8. It can be provided that a tread 14 of the wheel rim 4, 4', 4", 104 is hardened. Alternatively, the tread 14 may also only be tempered. If the tread 14 of the wheel rim 4, 4', 4", 104 is realized in hardened form, the surface hardness of the tread 14 advantageously has a Rockwell hardness of at least 40 HRC and less than 60 HRC, preferably at least 45 HRC and less than 55 HRC.

In the exemplary embodiments, a wheel rim 4, 4', 4", 104 having a circular-cylindrical tread 14 is illustrated, i.e. the tread 14 bounds the wheel rim 4 at a largest diameter 15 of the wheel rim 4 in a radial direction facing away from an axis of rotation 7 of the running wheel. The diameter 15 of the tread 14 of the wheel rim 4 simultaneously also defines the diameter of the running wheel 1, 1', 1", 101, 201, 2, 2', 2", 102, 202.

In the exemplary embodiments, the diameter 15 of the tread 14 of the wheel rim 4, 4', 4", 104 is 630 mm. Other values of the diameter 15 are also conceivable and possible depending on the required loading capacities, as mentioned at the beginning.

A rail head width of the running rail 26, 27 is advantageously between 50 mm and 150 mm, preferably between 75 mm and 120 mm.

The radial loading capacity of running wheels 1, 1', 1", 101, 201, 2, 2', 2", 102, 202 according to the invention advantageously lies within the range of 50 kN to 800 kN. At the preferred diameters 15 of the tread 14, i.e. from 500 mm to 710 mm, the radial loading capacity advantageously lies within the range of 200 kN to 500 kN. The axial forces which can be absorbed by the running wheel 1, 2, i.e. lateral forces in a direction parallel to the axis of rotation 7 of the running wheel, are advantageously up to 20% of the radial loading capacities mentioned.

The details of the connection of the hub 5, 5', 5" to the wheel rim 4 will be discussed with reference to the following first four exemplary embodiments of running wheels 1, 1', 1", 101, 2, 2', 2", 102 according to the invention. In the fifth and sixth exemplary embodiments, variants of a connection of the shaft 203, 303 to the hub 205, 305 of a running wheel 201, 202 are shown by way of example. It is emphasized once again at this juncture that a running wheel 1, 1', 1", 101, 201, 2, 2', 2", 102, 202 according to the invention can have only one of the connections mentioned or both connections.

In the first exemplary embodiment according to FIGS. 2 to 5, a running wheel 1, 2 which has what is referred to as a longitudinal interference fit is shown. A longitudinal interference fit is characterized in that the components to be connected for forming a press fit are essentially at the same temperature and are pushed "cold" into one another.

A press fit 6 is formed between the hub 5 and the wheel rim 4, i.e. the hub 5 and the wheel rim 4 are connected to each other with a force fit by the press fit 6. The forces occurring in the radial direction and in the circumferential direction, with respect to an axis of rotation 7 of the running wheel, during the operation of the crane 16 are transmitted via the press fit 6.

Figure 4:
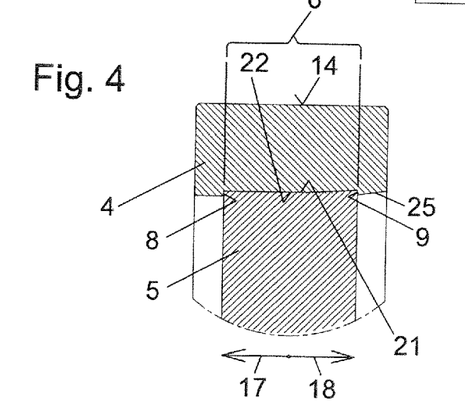
FIG. 4 shows the detail A from FIG. 3.

In addition to the press fit 6, it is provided that the connection between the hub 5 and the wheel rim 4 has a first form fit which is established by a first stop surface 8, wherein the first form fit blocks a relative movement of the hub 5 in relation to the wheel rim 4 in a first direction 17 running parallel in the axis of rotation 7 of the running wheel 1, 2, cf. FIG. 4. Furthermore, the connection between the hub 5 and the wheel rim 4 has a second stop surface 9 which secures the second form fit. The second form fit blocks the relative movement of the hub 5 in relation to the wheel rim 4 in a second direction 18 opposed to the first direction 17. As a result, i.e. in the operating state of the running wheel 1, 2, the relative movement of the hub 5 in relation to the wheel rim 4 with respect to directions parallel to the axis of rotation 7 of the running wheel is prevented.

As illustrated in the first exemplary embodiment, the first stop surface 8 and the second stop surface 9 are advantageously oriented orthogonally to the axis of rotation 7 of the running wheel.

The press fit 6 of the connection, as is also preferred, is arranged in the region between the first stop surface 8 and the second stop surface 9. The pressing forces bringing about the press fit 6 are preferably oriented in the radial direction with respect to the axis of rotation 7 of the running wheel. In the first exemplary embodiment, the press fit 6 extends between the first stop surface 8 and the second stop surface 9. In the first exemplary embodiment, the first stop surface 8 and the second stop surface 9 are arranged adjacent to the press fit 6.

The press fit 6 is designed in a force-fitting manner between a press fit inner surface 22, which faces the axis of rotation 7 of the running wheel, of the wheel rim 4 and a press fit outer surface 21, which faces away from the axis of rotation 7 of the running wheel, of the hub 5. The press fit inner surface 22 of the wheel rim 4 therefore bounds the wheel rim 4 inward in the radial direction, with respect to the axis of rotation 7 of the running wheel, in the region of the press fit 6. The press fit outer surface 21 of the hub 5 bounds the hub 5 outward in the radial direction, with respect to the axis of rotation 7 of the running wheel, in the region of the press fit 6.

In the first exemplary embodiment of a running wheel 1, 2 according to the invention, it is provided that the wheel rim 4 has the first stop surface 8 and the second stop surface 9. The first stop surface 8 and the second stop surface 9 and the press fit inner surface 22 of the wheel rim 4 are connected to one another integrally in terms of material. The tread 14 is also integrally formed in terms of material on the wheel rim 4, and therefore the wheel rim 4 as a whole is formed integrally, in particular integrally in terms of material. In the first exemplary embodiment, the wheel rim 4 furthermore has an integrally formed insertion bevel 25 which, as seen in a direction parallel to the axis of rotation 7 of the running wheel, is arranged on a side of the second stop surface 9 that faces away from the press fit 6. The insertion bevel 25 facilitates the pushing of the hub 5 into the wheel rim 4 and makes it possible to center the hub 5 in relation to the wheel rim 4. In the first exemplary embodiment, it is provided that the insertion bevel 25 is arranged on the wheel rim 4 adjacent to the second stop surface 9.

In the first exemplary embodiment, the press fit outer surface 21 of the hub 5 is conical in regions, cf. FIG. 4. In the operating state of the running wheel 1, 2, a largest outside diameter 20 of the press fit outer surface 21 is adjacent to the second stop surface 9 of the wheel rim 4, cf. FIGS. 4 and 5. The outside diameter 20 here is measured in the radial direction with respect to the axis of rotation 7 of the running wheel. An angle 32 of the cone 28, i.e. of the conical region of the press fit outer surface 21, is advantageously more than 1° and less than 10°. In the exemplary embodiment, the angle 32 is 5°. The press fit inner surface 22 of the wheel rim 4 has an internal cone 29 interacting with the cone 28, at least in an operating state of the running wheel 1, 2. In the exemplary embodiment, the inner cone 29 is directly adjacent to the second stop surface 9 of the wheel rim 4, cf. FIG. 5. Irrespective of the fact that, in the first exemplary embodiment, the press fit outer surface 21 of the hub 5 is conical in regions, the remaining press fit outer surface 21 is in the shape of a circular cylinder jacket. The same is true of the press fit inner surface 22 which, apart from the inner cone 28, is in the shape of a circular cylinder jacket.

The press fit outer surface 21 of the hub 5 and the press fit inner surface 22 of the wheel rim 4, as is preferred, run in an encircling manner in the circumferential direction with respect to the axis of rotation 7 of the running wheel, i.e. over 360°, in the first exemplary embodiment.

In the case of the running wheel 1, 2 of the first exemplary embodiment, i.e., for example, a running wheel 1, 2 with a diameter 15 of the tread 14 of 630 mm, an oversize of the press fit 6 is advantageously between 0.2 mm and 0.4 mm. That is to say, the press fit outer surface 21 of the hub 5 has an outside diameter larger by the specified oversize than the press fit inner surface 22 of the wheel rim 4. In the case of a comparable running wheel according to the prior art, the corresponding oversize is between 0.6 mm and 1 mm, and is therefore larger at least by the factor of 2 than in the case of the running wheel 1, 2 according to the invention. Owing to the significant reduction in the oversize in the case of the running wheel 1, 2 according to the invention, the supporting capacity can be increased in comparison to the prior art and the susceptibility of the running wheel 1, 2 to wear can be considerably reduced. Furthermore, the required pressing-in forces are correspondingly reduced.

Figure 5:
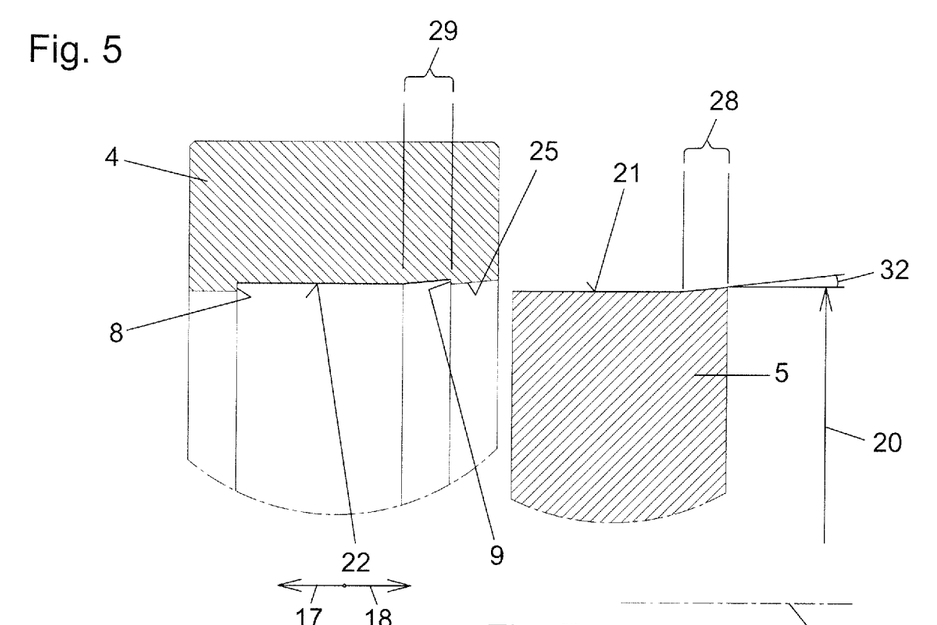
FIG. 5 shows the components, illustrated in FIG. 4, of the running wheel before being joined together.

A method according to the invention for producing the running wheel 1, 2 of the first exemplary embodiment will now be explained with reference to FIGS. 4 and 5. The hub 5 of the running wheel 1, 2 is pushed in the first direction 17 into the wheel rim 4. As the hub 5 is being pushed in, the second stop surface 9 is deformed elastically. That is to say, the second stop surface 9 is ineffective during the pushing in of the hub 5. In a completely pushed-in joining state, the hub 5 is in contact with the first stop surface 8, cf. FIG. 4, wherein the second stop surface 9 at least substantially takes up its original shape and forms the second form fit and, furthermore, blocks the relative movement of the hub 5 in the second direction 18 in relation to the wheel rim 4. In this context, "substantially" means that the second stop surface 9 may be subject to a small amount of wear as the hub 5 is being pushed into the wheel rim 4. However, it is essential that the stop surface 9 establishing the second form fit is effective in the joining state and blocks the relative movement of the hub 5 in relation to the wheel rim 4 in the second direction. The taking up of the original shape of the second stop surface 9 could also be referred to as elastic snapping back. As can easily be visualized in the overview of FIGS. 4 and 5, the cone 28 and the inner cone 29 advantageously lie over the full surface area against each other in the joining state.

The connection between the hub 5 and the wheel rim 4 can be released again, wherein, for example, the first form fit or the second form fit can then be removed by turning, and the connection is released by pressing the hub 5 out of the wheel rim 4. Subsequently, a new wheel rim 4 could in turn be used for connection to the hub 5. This makes it possible, for example, to replace a worn wheel rim 4 of the running wheel 1, 2.

Figure 6:
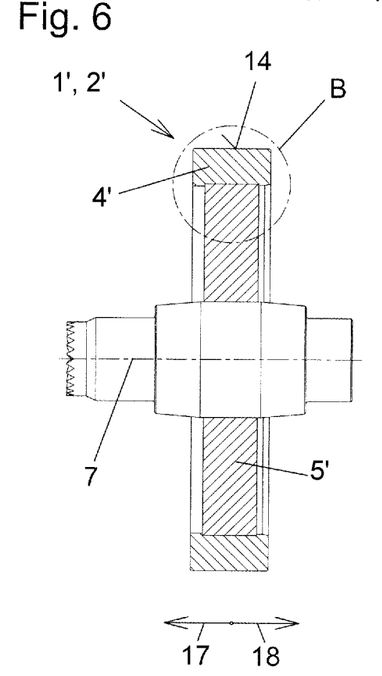
FIG. 6 shows a second exemplary embodiment of a running wheel analogous to FIG. 3.
Figure 7:
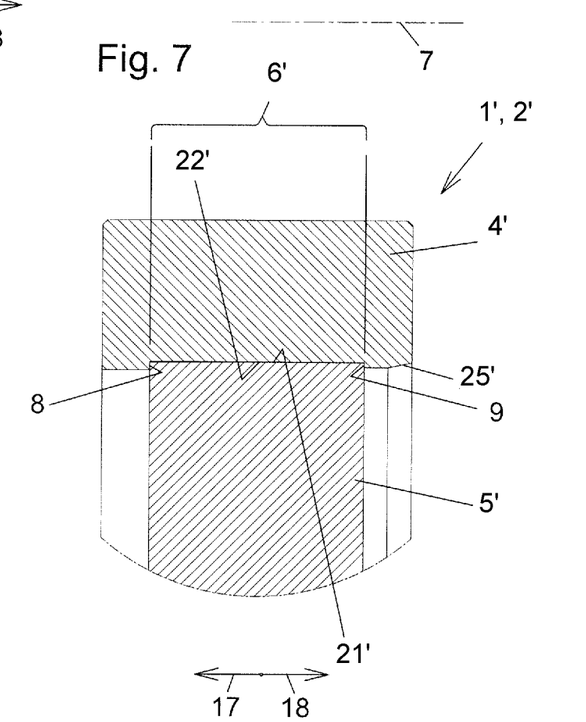
FIG. 7 shows the detail B from FIG. 6.
Figure 8:
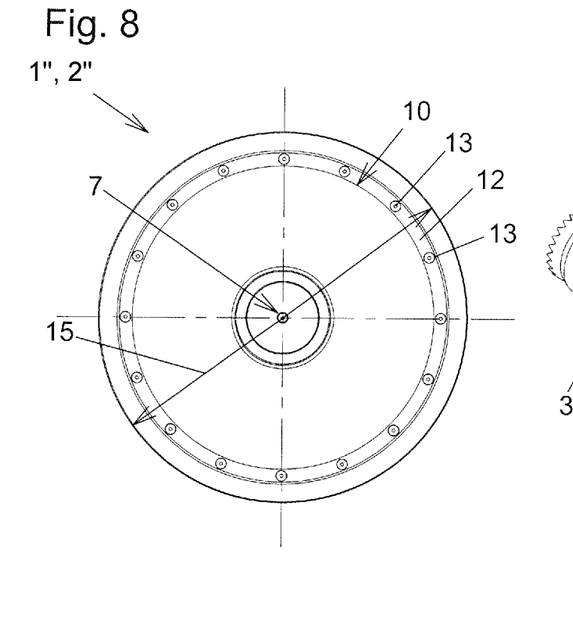
FIG. 8 shows a third exemplary embodiment according to the invention analogous to FIG. 2.
Figure 9:
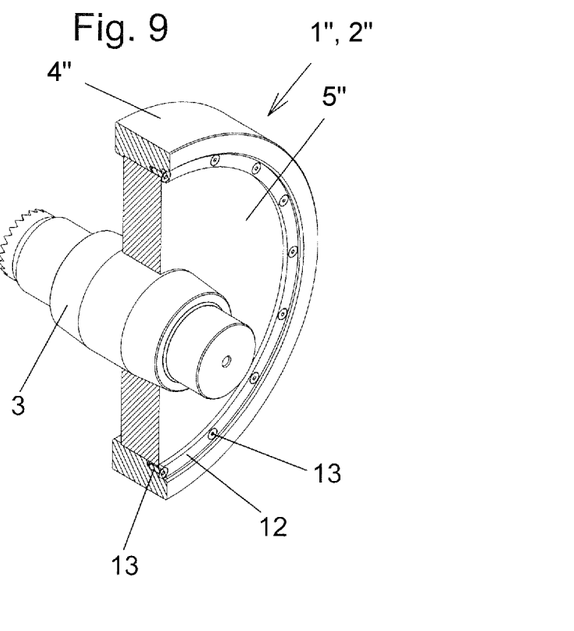
FIG. 9 shows an isometric view of the running wheel according to FIG. 8 in a partially sectioned illustration.
Figure 10:
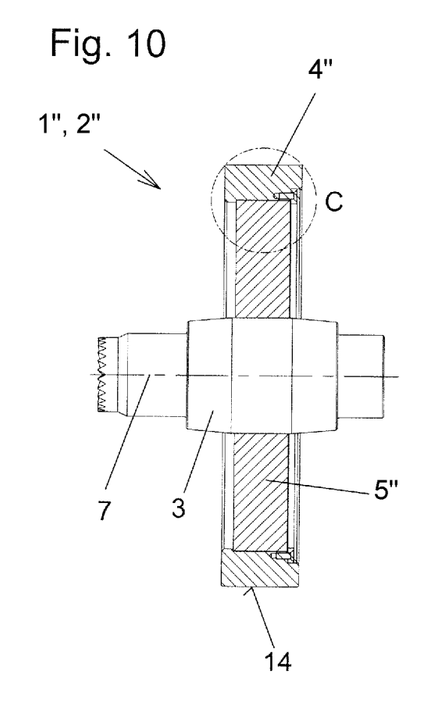
FIG. 10 shows a longitudinal center section of the running wheel according to FIG. 8.
Figure 11:
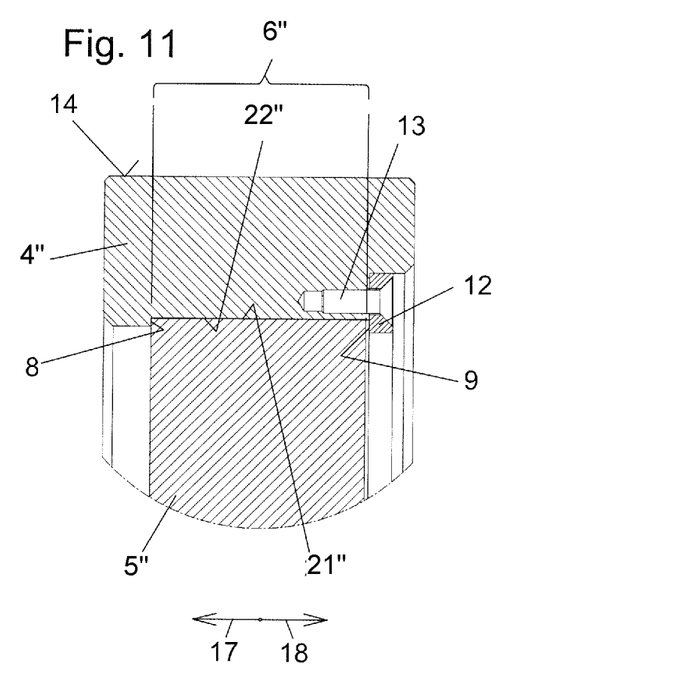
FIG. 11 shows the detail C from FIG. 10.

A second exemplary embodiment is shown in FIGS. 6 and 7. The structural design of the running wheel 1', 2' with shaft 3, wheel rim 4' and hub 5' has numerous similarities to the first exemplary embodiment, and therefore, in the explanations regarding the second exemplary embodiment, reference is primarily made to the differences over the first exemplary embodiment. Apart from the differences cited below, the explanations regarding the first exemplary embodiment also apply in the second exemplary embodiment.

The second exemplary embodiment shows what is referred to as a shrink fit 6'. In order to form a shrink fit 6', the components which are to be joined are brought to different temperatures. For example, it is possible to keep the hub 5 at room temperature and to heat the wheel rim 4' in an oil bath to an extent such that joining of the hub 5' into the wheel rim 4' with joining play is possible. By cooling the wheel rim 4', the wheel rim 4' is shrunk onto the hub 5'. The formation of a shrink fit is known in general in the region of mechanical engineering.

In the second exemplary embodiment, it is provided that the press fit outer surface 21' of the hub 5' is in the shape of a circular cylinder jacket. The mating surface of the wheel rim 4', i.e. the press fit inner surface 22' of the wheel rim 4', is also in the shape of a circular cylinder jacket.

In the second exemplary embodiment, it is provided that the insertion bevel 25' is arranged spaced apart from the second stop surface 9 with respect to the axis of rotation 7 of the running wheel. However, this is not compulsory. The insertion bevel 25' could also be adjacent to the stop surface 9, as is shown in the first exemplary embodiment.

The method for producing the running wheel 1', 2' according to the second exemplary embodiment can in principle take place analogously to the above-described method for producing the running wheel 1, 2 according to the first exemplary embodiment. In addition, before the hub 5' is pushed into the wheel rim 4' heating of the wheel rim 4', or cooling of the hub 5' advantageously takes place. As the hub 5' is being pushed into the wheel rim 4', it is also provided, in the case of the second exemplary embodiment, that the second stop surface 9 is ineffective. In a completely pushed-in joining state, the hub 5' is in contact with the first stop surface 8, cf. FIG. 4, wherein the second form fit at least substantially takes up its original shape and the second stop surface 9 establishing the second form fit furthermore blocks the relative movement of the hub 5' in relation to the wheel rim 4' in the second direction 18. The connection can be released analogously to the first exemplary embodiment. As assistance, the wheel rim 4' could be heated before the hub 5' is pushed out.

FIGS. 8 to 11 illustrate a third exemplary embodiment of a running wheel 1", 2" according to the invention. Apart from the differences cited below, the explanations regarding the first and second exemplary embodiment also apply in the third exemplary embodiment.

It is also provided in the case of the running wheel 1", 2" shown in FIGS. 8 to 11 that the connection has a second form fit which is established by a second stop surface 9 and blocks the relative movement of the hub 5" in relation to the wheel rim 4" in a second direction 18 opposed to the first direction 17. The press fit 6" according to the third exemplary embodiment can be designed as a longitudinal interference fit or as a shrink fit. Analogously to the second exemplary embodiment, the press fit outer surface 21" of the hub 5" and the press fit inner surface 22" of the wheel rim 4" are in the shape of a circular cylinder jacket, cf. FIG. 11.

In contrast to the previously mentioned exemplary embodiments, it is provided, in the case of the running wheel 1", 2" according to the third exemplary embodiment, that said running wheel has an additional or separate securing device 10, wherein the second stop surface 9 is arranged on the securing device 10.

It is provided in the third exemplary embodiment that the securing device 10 comprises a flange ring 12 which is of encircling design in the circumferential direction and has the stop surface 9. The securing device 10 furthermore has connecting elements, in particular screws 13, for fastening the flange ring 12 to the wheel rim 4". As a result, it is possible for the securing device 10 to be able to be fastened to the wheel rim 4" so as to be releasable again without destruction.

Figure 12:
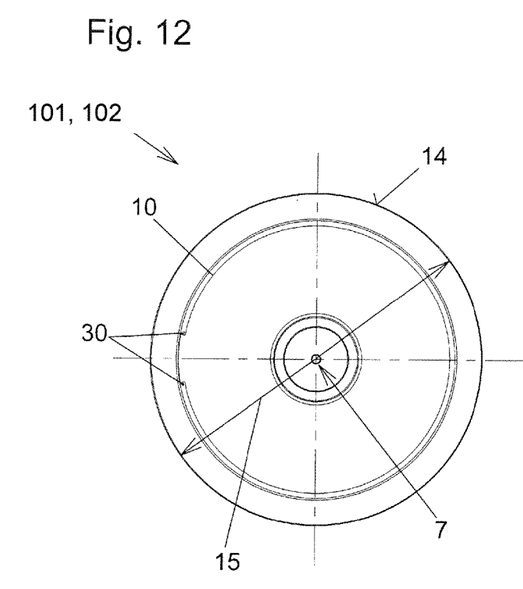
Figure 13:
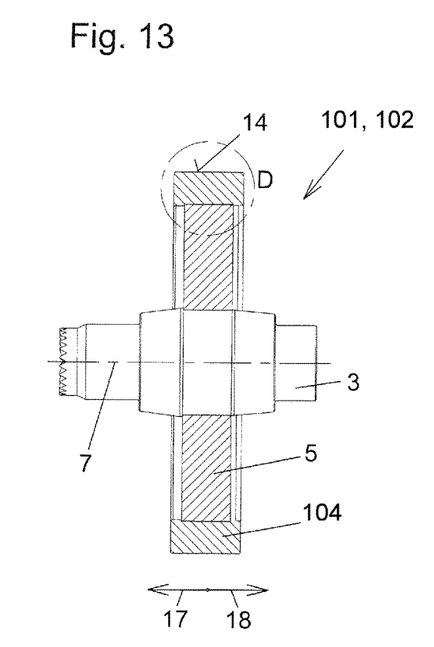
Figure 14:
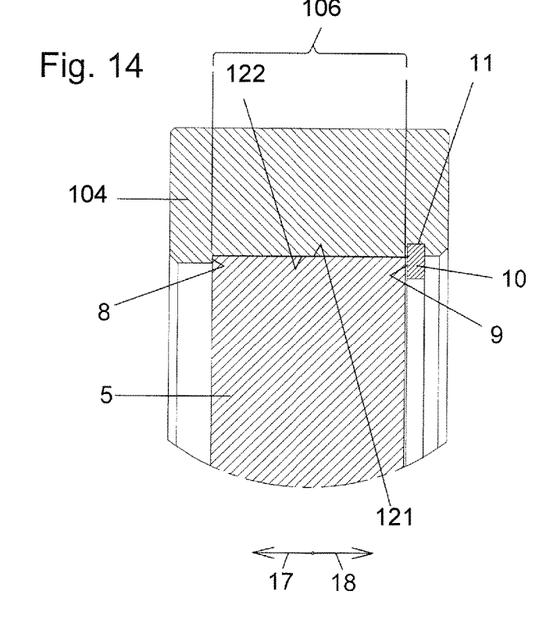
Figure 15:
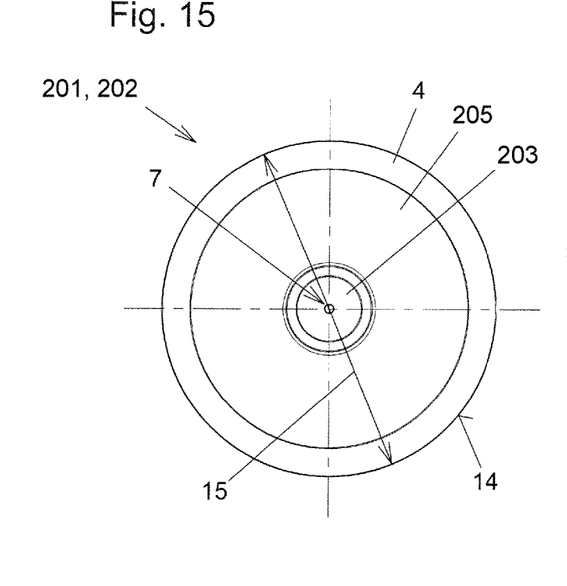
Figure 16:
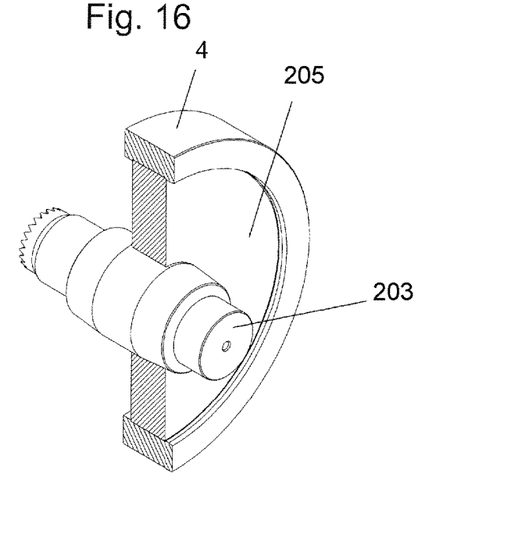

FIGS. 12 to 14 show an alternative embodiment of a running wheel 101, 102 with a securing device 10. With regard to the design of the press fit 106, reference is made to the explanations regarding the exemplary embodiments cited above. An interference or shrink fit for forming the press fit can also be realized in the fourth exemplary embodiment. Analogously to the second exemplary embodiment, the press fit outer surface 121 of the hub and the press fit inner surface 122 of the wheel rim 104 are in the shape of a circular cylinder jacket.

The running wheel 101, 102 of the fourth exemplary embodiment has a securing device 10 designed as a securing ring. Securing rings of this type are also referred to as a grooved ring. For this purpose, a groove 11 is advantageously formed on the wheel rim 104, cf. FIG. 14. It is provided, at least in the operating state of the running wheel 101, 102, that the securing ring engages in the groove 11 formed on the wheel rim 104. The securing device 10, which is designed as a securing ring, according to the fourth exemplary embodiment, has the second stop surface 9.

The securing ring is fastenable in a simple manner to the wheel rim 104 so as to be releasable again without destruction. In the exemplary embodiment shown, the securing ring has installation aids 30 which are designed as through bores and permit installation of the securing ring with a commercially available tool, see FIG. 12. The securing ring can be elastically deformed for the mounting and removal, as is known per se, wherein, during the elastic deformation, the outer circumference of the securing ring is reduced such that the latter can be inserted into the groove 11 or removed therefrom.

In contrast to the first two exemplary embodiments, it is provided, in the third and fourth exemplary embodiments, that the second form fit is secured only by fastening the securing device 10 to the wheel rim 4", 104.

In principle, all of the connections, which are illustrated in the first four exemplary embodiments, between the hub 5, 5', 5", 105 and the wheel rim 4, 4', 4", 104 can also be transferred to the connection between the shaft 3 and the hub 5, 5', 5", 105, i.e. to a shaft-hub connection. In particular, a securing device 10 having the second stop surface can also be provided for the connection between the shaft 3 and the hub 5, 5', 5", 105. A separate illustration of these embodiments has been omitted. However, it is clear to a person skilled in the art that a securing device 10 which is designed as a securing ring then engages in a groove formed on the shaft 3, or a securing device 10 which has a flange ring is fastenable or is fastened to the shaft 3.

FIGS. 15 to 18 illustrate a fifth exemplary embodiment of a running wheel 201, 202 according to the invention. Apart from the differences cited below, the explanations regarding the preceding exemplary embodiments, in particular regarding the second exemplary embodiment, also apply in the case of the fifth exemplary embodiment. FIGS. 15 to 18 show an example of a shrink fit for forming a press fit 206 between a shaft 203 and a hub 205.

Figure 17:
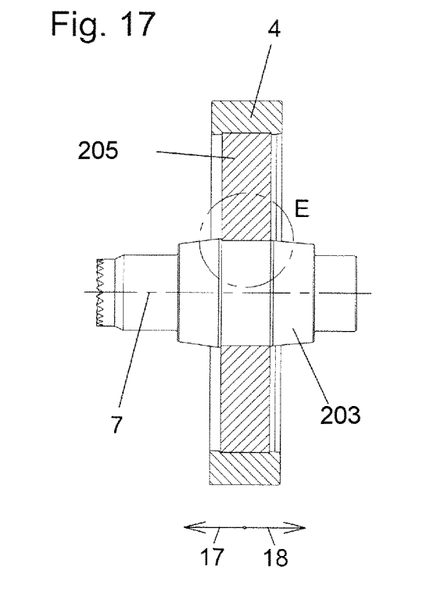
Figure 18:
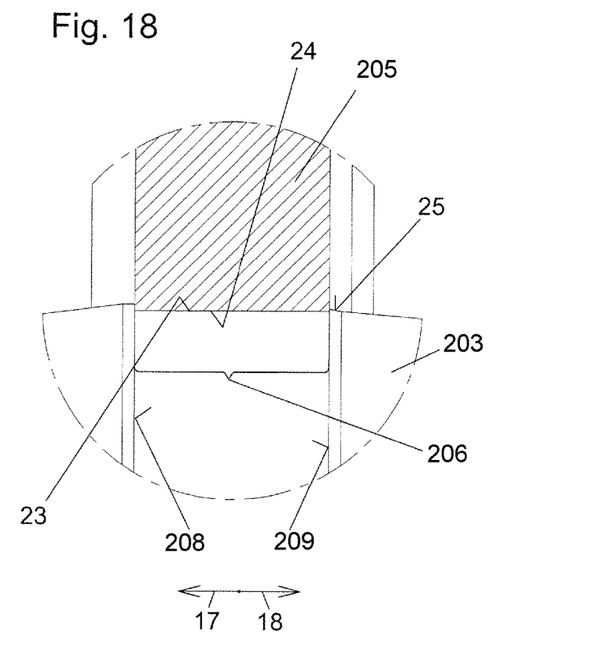

In the case of the fifth exemplary embodiment according to the invention, it is provided that the press fit 206 connects a press fit inner surface 24, which faces the axis of rotation 7 of the running wheel, of the hub 205 and a press fit outer surface 23, which faces away from the axis of rotation 7 of the running wheel, of the shaft 203 to each other in a force-fitting manner, cf. FIGS. 17 and 18. The shaft 203 here has the first stop surface 208 and the second stop surface 209. The first stop surface 208 and the second stop surface 209 and the press fit outer surface 23 of the shaft 203 are connected to one another integrally in terms of material.

The press fit inner surface 24 of the hub 5 is designed in the shape of a circular cylinder jacket. The same is true of the press fit outer surface 23 of the shaft 203. In this exemplary embodiment, the shaft 203 has an insertion bevel 25 analogously to the first and second exemplary embodiment, wherein the insertion bevel 25 is integrally formed on the shaft 203. The insertion bevel 25 is arranged on a side of the second stop surface 209 that faces away from the press fit 206, as seen in a direction parallel to the axis of rotation 7 of the running wheel, cf. FIG. 18.

The connection between the shaft 203 and the hub 205 has a first form fit which is established by the first stop surface 208, wherein the first form fit blocks the relative movement of the shaft 203 in relation to the hub 205 in a first direction 17 running parallel to the axis of rotation 7 of the running wheel 1, 2, cf. FIG. 18. Furthermore, the connection between the shaft 203 and the hub 205 has the second stop surface 209 which secures the second form fit. The second form fit blocks the relative movement of the shaft 203 in relation to the hub 205 in a second direction 18 opposed to the first direction 17. As a result, the relative movement of the shaft 203 in relation to the hub 5 with respect to directions parallel to the axis of rotation 7 of the running wheel is prevented.

In the case of a method for producing a running wheel 201, 202 according to the fifth exemplary embodiment, it can be provided that the shaft 203 is pushed in the first direction 17 into the hub 205, wherein the second stop surface 209 is elastically deformed during the pushing in of the shaft 203, and, in order to form the second form fit in a completely pushed-in joining state, in which the shaft 203 is in contact with the first stop surface 208, the second stop surface 209 at least substantially takes up its original shape and therefore blocks the relative movement of the shaft 203 in relation to the hub 5 in the second direction 18.

Figure 19:
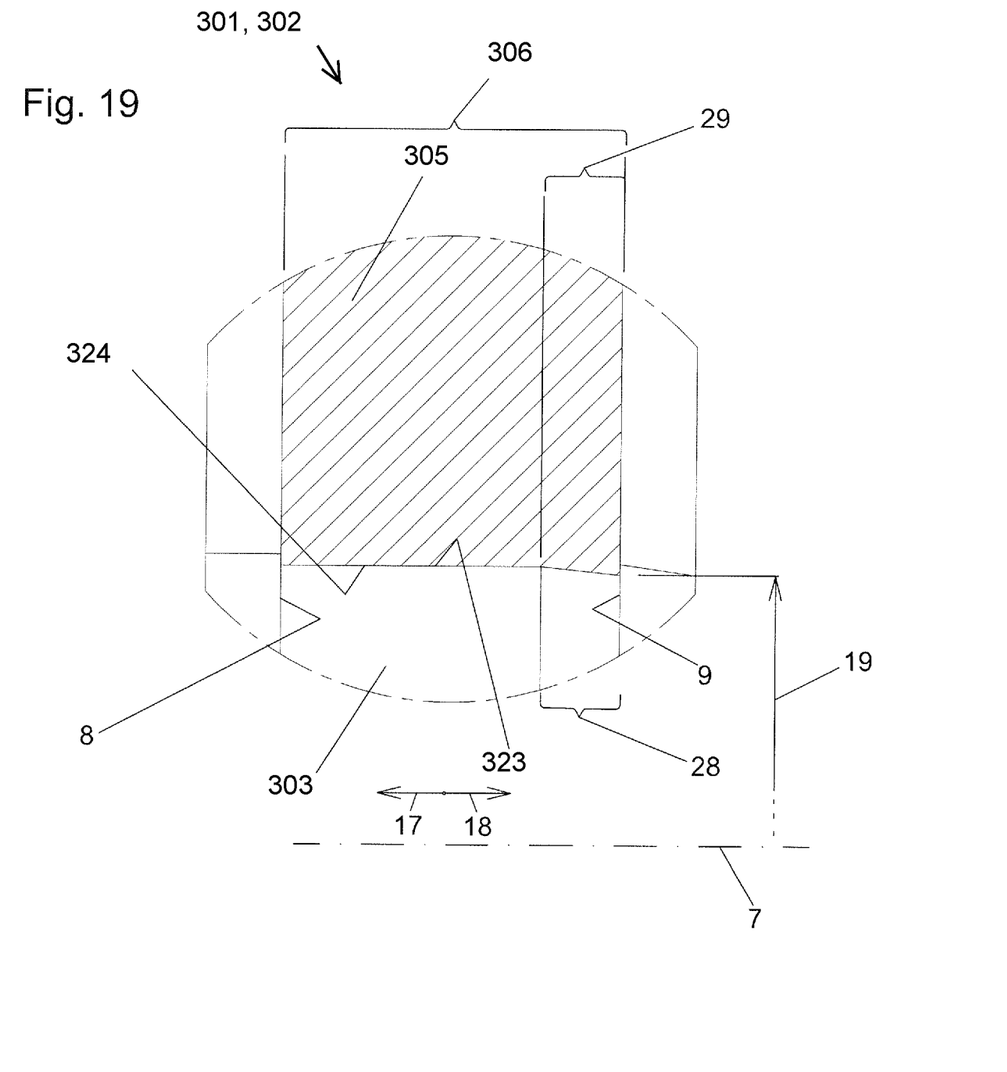
FIG. 19 shows a sixth exemplary embodiment of a running wheel.

FIG. 19 illustrates a further alternative embodiment of a running wheel 301, 302 according to the invention. The press fit 306 is realized here as an interference fit and substantially corresponds to the transfer of the longitudinal interference fit of the first exemplary embodiment to the connection between the shaft 303 and the hub 305. Apart from the differences cited below, the explanations regarding the preceding exemplary embodiments, in particular regarding the fifth exemplary embodiment, also apply in the case of the sixth exemplary embodiment.

The press fit inner surface 324 of the hub 5 of the sixth exemplary embodiment of a running wheel 301, 302 is conical at least in regions. That is to say, the press fit inner surface 324 of the shaft 303 is designed in regions as an inner cone 29, cf. FIG. 19. In an operating state of the running wheel 1, 2, a smallest inside diameter 19 of the press fit inner surface 324 is adjacent to the second stop surface 9 of the shaft 303. The smallest inside diameter 19 of the press fit inner surface 324 should be measured in the radial direction with respect to the axis of rotation 7 of the running wheel. The shaft 303 has the corresponding mating contour, i.e. a cone 28 which is adjacent to the second stop surface 9.

In a departure from the exemplary embodiments, which are illustrated in the figures, of running wheels 1, 1', 1", 101, 201, 201, 2, 2', 2", 102, 202, 302 having a circular-cylindrical tread 14, it is also conceivable and possible for the wheel rim 4, 4', 4", 104 of a running wheel 1, 1', 1", 101, 201, 201, 2, 2', 2", 102, 202, 302 according to the invention to have an encircling groove. The flanks bounding the groove, as seen with respect to a direction parallel to an axis of rotation 7 of the running wheel, are generally also referred to as wheel flanges. Embodiments of running wheels having only one wheel flange are also conceivable and possible within the scope of the invention.

KEY TO THE REFERENCE NUMBERS

1, 1', 1, 101, 201, 301 Running wheel
2, 2', 2", 102, 202, 302 Running wheel
3, 203, 303 Shaft
4, 4', 4", 104 Wheel rim
5, 5', 5", 205, 305 Hub
6, 6', 6", 106, 206, 306 Press fit
7 Axis of rotation of the running wheel
8, 208 First stop surface
9, 209 Second stop surface
10 Securing device
11 Groove
12 Flange ring
13 Screw
14 Tread
15 Diameter
16 Crane
17 First direction
18 Second direction
19 Inside diameter
20 Outside diameter
21, 21', 21", 121 Press fit outer surface
22, 22', 22", 122 Press fit inner surface
23, 323 Press fit outer surface
24, 324 Press fit inner surface
25 Insertion bevel
26 Running rail
27 Running rail
28 Cone
29 Inner cone
30 Installation aid
31 Trolley
32 Angle

The invention claimed is:

1. A running wheel for a crane, comprising
   a shaft,
   a wheel rim,
   a hub connecting the shaft to the wheel rim for rotation therewith,
   at least one connection between the hub and the shaft or between the hub and the wheel rim, the at least one connection comprising a press fit and a first form fit established by a first stop surface, the first form fit blocking a relative movement of the hub in relation to the shaft or the wheel rim in a first direction that extends parallel to an axis of rotation of the running wheel, and at least one second form fit established by a second stop surface, the second form fit blocking a relative movement of the hub in relation to the shaft or the wheel rim in a second direction opposite to the first direction,
   the press fit is arranged in a region between the first stop surface and the second stop surface, and
   the press fit connects a press fit inner surface of the wheel rim that faces the axis of rotation of the running wheel and a press fit outer surface of the hub that faces away from the axis of rotation of the running wheel to each other with a force fit.

2. The running wheel as claimed in claim 1, wherein the press fit connects a press fit inner surface of the hub that faces the axis of rotation of the running wheel and a press fit outer surface of the shaft that faces away from the axis of rotation of the running wheel to each other with a force fit.

3. The running wheel as claimed in claim 2, wherein at least one of (a) the shaft includes the first stop surface and the second stop surface, and the first stop surface and the second stop surface and the press fit outer surface of the shaft are integrally formed in a material of the shaft, or (b) the wheel rim has the first stop surface and the second stop surface, and the first stop surface and the second stop surface and the press fit inner surface of the wheel rim are integrally formed in a material of the wheel rim.

4. The running wheel as claimed in claim 3, wherein at least one of (a) the press fit inner surface of the hub is conical at least in regions, and a smallest inside diameter of the press fit inner surface is adjacent to the second stop surface of the shaft in an operating state of the running wheel, or (b) the press fit outer surface of the hub is conical at least in regions and a largest outside diameter of the press fit outer surface is adjacent to the second stop surface of the wheel rim in the operating state of the running wheel.

5. The running wheel as claimed in claim 1, wherein at least one of the shaft or the wheel rim includes an integrally formed insertion bevel, and the insertion bevel is arranged on a side of the second stop surface that faces away from the press fit.

6. The running wheel as claimed in claim 1, wherein the running wheel includes at least one securing device, and the second stop surface is arranged on the securing device.

7. The running wheel as claimed in claim 6, wherein the at least one securing device is a securing ring which engages in a groove formed on at least one of the wheel rim or on the shaft.

8. The running wheel as claimed in claim 6, wherein the at least one securing device is fastenable or fastened to at least one of the wheel rim or to the shaft.

9. The running wheel as claimed in claim 8, wherein the at least one securing device is releasably fastenable or fastened to allow removal without destruction using connecting elements.

10. A method for producing a running wheel as claimed in claim 1, comprising:
    (a) pushing the hub in the first direction into the wheel rim, and elastically deforming the second stop surface during the pushing in of the hub, and, in a completely pushed in joining state, in which the hub is in contact with the first stop surface, the second stop surface elastically returning at least substantially to an original shape with the second stop surface establishing the second form fit and blocking a relative movement of the hub in relation to the wheel rim in the second direction, or (b) pushing the shaft into the hub in the first direction, and elastically deforming the second stop surface during the pushing in of the shaft, and, in a completely pushed in joining state, in which the shaft is in contact with the first stop surface, the second stop surface elastically returning at least substantially to an original shape with the second stop surface establishing the second form fit blocking a relative movement of the shaft in relation to the hub in the second direction.

11. A crane comprising at least one running wheel as claimed in claim 1.

* * * * *